United States Patent
Biegert et al.

(10) Patent No.: US 8,599,889 B2
(45) Date of Patent: Dec. 3, 2013

(54) PULSED LIGHT SOURCE

(75) Inventors: Jens Biegert, Castelldefels (ES); Olivier Chalus, Castelldefels (ES); Philip Bates, Castelldefels (ES)

(73) Assignee: Fundacio Institut de Ciencies Fotoniques, Barcelona (ES)

( * ) Notice: Subject to any disclaimer, the term of this patent is extended or adjusted under 35 U.S.C. 154(b) by 0 days.

(21) Appl. No.: 13/704,429

(22) PCT Filed: Jun. 14, 2010

(86) PCT No.: PCT/EP2010/058279
§ 371 (c)(1),
(2), (4) Date: Feb. 27, 2013

(87) PCT Pub. No.: WO2011/157284
PCT Pub. Date: Dec. 22, 2011

(65) Prior Publication Data
US 2013/0156055 A1 Jun. 20, 2013

(51) Int. Cl.
*H01S 3/10* (2006.01)
*H01S 3/00* (2006.01)

(52) U.S. Cl.
USPC ............... 372/25; 372/21; 372/22; 359/340; 359/333

(58) Field of Classification Search
USPC ............ 372/21, 22, 25, 30, 97; 359/333, 340, 359/345
See application file for complete search history.

(56) References Cited

U.S. PATENT DOCUMENTS 6,728,273 B2 * 4/2004 Perry ........................ 372/18
2009/0244695 A1 * 10/2009 Marcinkevicius et al. ... 359/340

* cited by examiner

*Primary Examiner* — Armando Rodriguez
(74) *Attorney, Agent, or Firm* — Gary J. Gershik; Cooper & Dunham LLP

(57) ABSTRACT

Pulsed light source comprising pulse generation means (1), such as an optical oscillator, whose output is divided into three arms: two arms (3, 4) to generate a CEP-stable, ultra-broadband idler output; and a third arm (5) to generate a narrowband pump output. The pump output and idler output seed an OPCPA (13), generating stable ultrashort pulses.

20 Claims, 1 Drawing Sheet

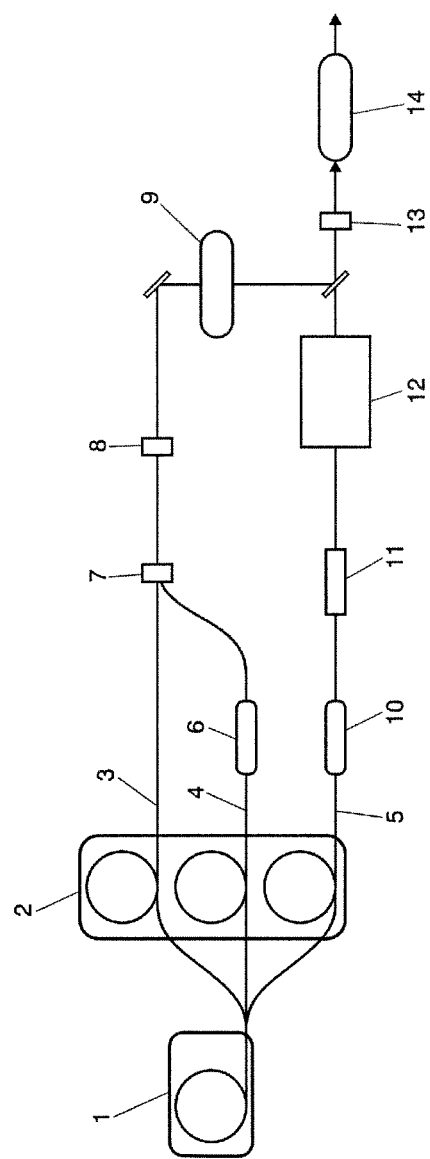

PULSED LIGHT SOURCE

RELATED APPLICATIONS

This application is a §371 national stage of PCT International Application No. PCT/EP2010/058279, filed Jun. 14, 2010, the contents of each of which are hereby incorporated by reference into this application.

FIELD OF THE INVENTION

The present invention has its application within the sector of light sources and especially, in the field of pulsed laser sources.

BACKGROUND OF THE INVENTION

The generation of ultrashort light pulses is one of the main lines of research in the field of laser sources. The term "ultrashort pulses" refers to pulses with lengths ranging from hundreds of femtoseconds to picoseconds. These pulses are characterised by a high peak intensity, which can lead to nonlinear effects in different materials. Applications of ultrashort pulses include, for example, medical imaging, Terahertz rays generation and frequency comb generation.

However, it should be noted that there are significant differences between pulses of around 100 fs and pulses under about 30 fs. Because of the Fourier-transform relationship between the temporal and frequency domain descriptions of the laser pulse, the bandwidth of short pulses increases as their time duration decreases. Thus, in the spectral domain, the key feature of ultrashort pulses is that they have large bandwidths.

As the duration decreases, the bandwidth increases inversely. In the near infrared (NIR) 700-3000 nm, a 100 fs pulse has a bandwidth of approximately 8 nm, while a 30 fs pulse has a bandwidth of approximately 40 nm. In the mid-IR from 3000-15000 nm, the required bandwidth is greatly increased over all the pulse durations—this is because the bandwidth-time duration relationship is fundamentally related to the number of optical cycles in the pulse. One period of the electric field, or "cycle" lasts 2.7 fs at 800 nm, and 10.7 fs at 3200 nm. Thus, for a pulse comprising two cycles, the resulting bandwidth is 170 nm Full Width at Half Maximum (FWHM) for 800 nm (NIR) and 700 nm FWHM for 3200 nm (mid-IR). These large bandwidths offer unique advantages for multi-line spectroscopy of gases, as the pulse spectrum simultaneously covers a huge range of absorption lines for different molecules.

Existing high energy sub-100 fs laser pulses typically come from Ti:Sapphire based chirped-pulse amplification (CPA) laser systems. These systems are limited in pulse duration and the wavelength at which they operate due to the gain bandwidth of the Ti:Sapphire amplifier medium, which restricts the output pulse to a spectral range of 600-1100 nm, and a bandwidth of a few tens of nm for high energy systems.

An alternative technique is optical parametric amplification (OPA), which converts energy from a pump pulse to a signal pulse, in a nonlinear crystal, while generating an idler pulse. This has the advantage of amplifying ultrashort pulses with broad bandwidth, and is not limited to a specific wavelength range, but is limited in energy due to the high peak powers, and requires precise synchronisation of the pump and signal lasers.

A combination of the two techniques can be used to produce ultrashort pulses: for example, U.S. Pat. No. 6,873,454 B2 presents a system in which Ti:Sapphire oscillator pulses are first amplified in an OPA and then directed into a Ti:Sapphire amplifier. Further configurations for generating pulses with durations of less than nanoseconds are disclosed in U.S. Pat. No. 7,630,418 B2, also using two different laser sources to feed the system.

US 2009/0244695 A1 presents a different approach to the problem of light source amplification, in this case, using a single oscillator which is divided into two arms, one of which is spectrally broadened while the other one is stretched, amplified in gain storage amplifier, and compressed. The resulting signals from both arms feed an optical parametric amplifier, which is followed by an additional compressor.

Additionally, these systems do not offer the possibility to control the Carrier Envelope Phase (CEP) of the pulses. The CEP is defined as the phase offset between the peak of the amplitude envelope and the peak of the carrier electric field. In the case of few-cycle pulses (that is, pulses formed by only a few periods of the carrier electric field, which means that the pulse has only one or two strong peaks underneath the pulse envelope), CEP is especially relevant as the shape and strength of the electrical field changes as a function of the CEP. Thus, for repeatable operations, a constant CEP for each pulse in a laser pulse train is desired.

Additionally, in order to generate high gain over a broad bandwidth for the amplification of ultrashort pulses, a technique called Optical Parametric Chirped-pulse Amplification (OPCPA) is known. By amplifying temporally stretched pulses (that is, chirped pulses) using optical parametric amplifiers, it is possible to avoid high peak powers in the amplified pulses and hence reach high energies without optical damage. The gain of a OPCPA system for a single pass through a nonlinear crystal is typically much greater than that of a conventional gain storage amplifier. Also, the gain spectrum can be extremely broadband, and can also be centred over a large range of central wavelengths. As a result of the parametric nature of the process, almost no energy is transferred to the amplifier, thus making the system free from thermal lensing and allowing multi-kHz operation with good beam quality. In order to achieve the aforementioned operation over broad gain bandwidths with central wavelengths in different parts of the NIR and mid-IR, restrictive phase-matching conditions must be fulfilled. This include choice of the correct crystal, the use of a high quality pump beam, correct choice of seed and pump pulse durations and in particular accurate temporal synchronisation of the pump and seed beam. This last point in particular has been a strong technical limitation of many of the aforementioned systems.

As a result, there is still a need in the state of the art of a stable ultrashort pulsed light source with a broad bandwidth and which is able to provide an stable CEP.

SUMMARY OF THE INVENTION

The current invention solves the aforementioned problems by disclosing a pulsed light source able to generate ultrashort pulses in a wide bandwidth range with high stability and stabilised CEP. The disclosed pulsed light source comprises a single pulse generation means, such an oscillator or a Master Oscillator Power Amplifier (MOPA), to generate a pulsed signal $s_0$ (centred at a predefined wavelength $\lambda_s$), with possible additional amplification, which is divided into three or more arms (a first and a second arm to generate a idler output and a third arm to generate a pump output with further arms as needed for any amplification or frequency mixing), granting temporal coherence and synchronisation among signals transmitted over said arms.

The first arm does not necessarily apply any modification to the pulsed signal $s_0$ (although it may include frequency shifting, amplification stages or other signal conditioning modules), thus generating a wavelength $\lambda_0$. The second arm comprises wavelength shifting means which shift the pulsed signal $s_0$ to a second wavelength $\lambda_1$. The signals resulting from the first and second arms are then frequency mixed, preferably by a Difference-Frequency Generation (DFG) Crystal, resulting in a broad bandwidth idler signal centered at a greater wavelength $\lambda_2$, typically located in, but not restricted to, the mid Infra-red (mid-IR). In order to reach the energy thresholds to activate the DFG, signals from both arms are required to be broadband ultrashort pulses. Also, as the signals generated at the first and second arms come from the same oscillator, they have the advantage of having identical CEP and of perfect temporal synchronisation.

Preferably, signals from the first arm and the second arm are coupled before the frequency mixing, thus reducing the need for alignment of the system. Also preferably, the system comprises a pulse stretcher which operates on the idler output.

Shorter wavelengths ($\lambda_2$) than mid-IR can be generated from said two arms by either frequency doubling signal $s_0$, both of the two input arms to the DFG stage, or after the DFG stage.

The third arm (that is, the pump arm), preferably comprises wavelength shifting means, before and/or after amplification, to shift the original pulses signal $s_0$ to a third wavelength $\lambda_3$, shorter than $\lambda_2$.

The third arm employs techniques to control the bandwidth and temporal structure to adapt the wavelength, bandwidth and energy of the pump output, thus allowing the light source to provide stable ultrashort pulses in a wide range of operation.

Finally, the pump output and the idler output are received at an amplification stage, preferably comprising one or more OPCPA stages, and the output of said amplification stage is compressed by a pulse compressor, generating ultrashort pulses (including few-cycles pulses). Preferably, the pulse compressor compensates residual higher order dispersion either by means of programmable dispersion compensation, by a fixed phase-plate, or with chirped mirrors.

Advantageously, OCPCA preserves CEP, operates in a wide range of bandwidths, and by offering a very high single pass gain, allows the pulsed light source to be built in a compact system with low amounts of dispersive amplifier materials.

These and other advantages will be apparent in the light of the detailed description of the invention.

BRIEF DESCRIPTION OF THE DRAWINGS

For the purpose of aiding the understanding of the characteristics of the invention, according to a preferred practical embodiment thereof and in order to complement this description, the following FIGURE is attached as an integral part thereof, having an illustrative and non-limiting character:

FIG. 1 shows a scheme of the pulsed light source of the invention according to a preferred embodiment.

DETAILED DESCRIPTION OF THE INVENTION

The matters defined in this detailed description are provided to assist in a comprehensive understanding of the invention. Accordingly, those of ordinary skill in the art will recognise that variation, changes and modifications of the embodiments described herein can be made without departing from the scope and spirit of the invention. It should also be noticed that values for the wavelengths, energy and duration of optical signals are presented to facilitate the comprehension of the invention. These values are to be regarded as mere examples, as other combinations of said values can be used to generate the ultrashort pulses.

Note that in this text, the term "comprises" and its derivations (such as "comprising", etc.) should not be understood in an excluding sense, that is, these terms should not be interpreted as excluding the possibility that what is described and defined may include further elements, steps, etc.

FIG. 1 presents a preferred scheme of the pulsed light source of the invention. According to said scheme, a fibre oscillator 1 generates an original pulsed signal with broadband pulses with a duration in the range of femtoseconds and an energy between picoJoules and nanoJoules. Said original pulsed signal generated by the oscillator has a central wavelength of 1550 nm, and is fed to three arms: a first idler arm 3, a second idler arm 4 and a pump arm 5. All of the arms may include fibre amplifiers 2.

While the first idler arm 3 maintains the wavelength of the original pulsed signal, the second idler arm 4 presents first wavelength shifting means 6 that shift its wavelength to 1030 nm. The wavelength shifting can be accomplished by raman shifting, propagation in a nonlinear optical fibre, in a photonic crystal fibre or in a filament in bulk material or gas. After recombining the result of both arms by means of a coupler 7, pulses at 1550 nm and pulses at 1030 nm present perfect spatial overlap and a timing jitter typically under $10^{-17}$ s. As pulses at both wavelengths come from the same oscillator 1, they present an un-stabilised but identical CEP (the wavelength shift implies a constant CEP shift but does not change any random variations).

The overlapping 1550 nm and 1030 nm pulses feed a DFG crystal 8, which generates the idler output (also named "idler signal") with CEP-stable pulses in the mid-IR (3200 nm), which present a broad bandwidth and energies ranging from picoJoules to nanoJoules. The idler wave carries the phase difference between the DFG input signal (first auxiliary signal, centered at 1550 nm) and DFG pump (second auxiliary signal, centered at 1030 nm), so the randomly varying part of the CEP cancels out, leaving only a fixed and constant CEP value. This passive CEP stabilisation has been shown to give stability as good as or better than the state of the art electronic systems. It is sensitive only to changes in timing between the signal and pump pulses as the travel from the common oscillator to the DFG stage—for fibre lasers this has been measured to be as low as 1 as, corresponding to a CEP change of 2 mrad. This passive stabilisation has no limitation in time duration due to its passive nature. Stability up to 200 hrs has been demonstrated.

A time stretcher 9 finally stretches the idler output before it enters the OPCPA stage 13. Notice that more than one OPCPA stage 13 may be used in order to achieve the desired output powers. The time stretcher 9 may be achieved using either material dispersion, or dispersive optical elements that cause different wavelengths to travel along different path lengths, like for example, two parallel gratings.

The OPCPA is also fed by a pump signal generated by the pump arm 5, which comprises:

Second wavelength shifting means 10 which shift the central wavelength to 1064 nm. This can be any of the aforementioned wavelength shifting means described above for idler arm 2.

Wavelength narrowing means 11 after which the pump signal comprises picosecond pulses with narrow bandwidth and energies ranging from picoJules to nanoJules. The wavelength narrowing can be achieved using fibre bragg gratings, a laser line filter, or a narrow-gain preamplifier.

Pump laser amplifier 12.

After the interaction of the idler and pump signals at the OPCPA, a compressor is included to generate the mid-IR broadband output pulses, with durations under 100 fs and stable CEP.

In another preferred embodiment, output pulses at shorter wavelengths, for example, in the near IR, can be generated by including frequency doubling means, either at the original pulsed signal $s_o$, at both of the two input arms to the DFG stage (that is, at the idler arms), or after the DFG stage.

The invention claimed is:

1. A pulsed light source comprising:
    pulse generation means (1) adapted to generate a pulsed signal at a first wavelength;
    a first idler arm (3) adapted to receive the pulsed signal from the pulse generation means (1) and to generate a first auxiliary signal at the first wavelength;
    a second idler arm (4) adapted to receive the pulsed signal from the pulse generation means (1) and comprising first shifting means (6) adapted to generate a second auxiliary signal at a second wavelength;
    signal mixing means (8) adapted to mix the first auxiliary signal and the second auxiliary signal and to generate a idler output at a third wavelength;
    a pump arm (5) adapted to receive the pulsed signal from the pulse generation means (1) and to generate a pump output;
    at least one optical parametric chirped-pulse amplification stage (13) adapted to receive the idler output and the pump output and to amplify the idler output;
    a pulse compressor (14) adapted to reduce a temporal length of the amplified idler output and to generate ultrashort light pulses;
    pulse stretching means (9) adapted to stretch pulses of the idler output;
    wavelength narrowing means (11) adapted to reduce the spectral bandwidth of the pump output; and
    fibre amplifiers (2) in the first idler arm (3), the second idler arm (4) and the pump arm (5) adapted to amplify the pulsed signal from the pulse generation means (1),
    wherein
    the first idler arm (3) and the second idler arm (4) are adapted to maintain the same carrier envelope phase between the first auxiliary signal and the second auxiliary signal, wherein said carrier envelope phase comprises a random variation;
    the signal mixing means (8) are adapted to cancel the random variation of the carrier envelope phase;
    the at least one optical parametric chirped-pulse amplification stage (13) is adapted to preserve the carrier envelope phase; and
    the pulse compressor is adapted to generate the ultrashort light pulses with a stable carrier envelope phase.

2. The pulsed light source according to claim 1, wherein the pulse generation means (1) is a Master Oscillator Power Amplifier System.

3. The pulsed light source according to claim 1, wherein the first idler arm and the second idler arm further comprise a second harmonic generation stage.

4. The pulsed light source according to claim 1, wherein the pump arm (5) further comprises second wavelength shifting means (10) configured to shift the wavelength of the pulsed signal from the pulse generation means (1) to a third wavelength.

5. The pulsed light source according to claim 1, wherein the pump arm (5) further comprises an amplifier (12) adapted to amplify the pump output.

6. The pulsed light source according to claim 1, further comprising coupling means (7) adapted to couple the first auxiliary signal and the second auxiliary signal before the signal mixing means (8).

7. The pulsed light source according to claim 1, wherein the pulse compressor (14) further comprises programmable dispersion compensation means.

8. The pulsed light source according to claim 1, wherein the pulse compressor (14) further comprises a fixed phase-plate adapted to compensate dispersion.

9. The pulsed light source according to claim 1, wherein the pulse compressor (14) further comprises chirped dielectric mirrors adapted to compensate dispersion.

10. The pulsed light source according to claim 1, wherein the signal mixing means (8) is a Difference-Frequency Generation Crystal.

11. The pulsed light source according to claim 10, wherein the first auxiliary signal and the second auxiliary signal comprise broadband ultrashort pulses.

12. The pulsed light source according to claim 2, wherein the first idler arm and the second idler arm further comprise a second harmonic generation stage.

13. The pulsed light source according to claim 12, wherein the pump arm (5) further comprises second wavelength shifting means (10) configured to shift the wavelength of the pulsed signal from the pulse generation means (1) to a third wavelength.

14. The pulsed light source according to claim 13, wherein the pump arm (5) further comprises an amplifier (12) adapted to amplify the pump output.

15. The pulsed light source according to claim 14, further comprising coupling means (7) adapted to couple the first auxiliary signal and the second auxiliary signal before the signal mixing means (8).

16. The pulsed light source according to claim 15, wherein the pulse compressor (14) further comprises programmable dispersion compensation means.

17. The pulsed light source according to claim 16, wherein the pulse compressor (14) further comprises a fixed phase-plate adapted to compensate dispersion.

18. The pulsed light source according to claim 17, wherein the pulse compressor (14) further comprises chirped dielectric mirrors adapted to compensate dispersion.

19. The pulsed light source according to claim 18, wherein the signal mixing means (8) is a Difference-Frequency Generation Crystal.

20. The pulsed light source according to claim 17, wherein the signal mixing means (8) is a Difference-Frequency Generation Crystal.

* * * * *